United States Patent
Kuei

(10) Patent No.: US 7,586,698 B2
(45) Date of Patent: Sep. 8, 2009

(54) SPHERICAL ABERRATION CONTROL METHOD AND RELATED APPARATUS

(75) Inventor: Yu-Chen Kuei, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 11/766,790

(22) Filed: Jun. 21, 2007

(65) Prior Publication Data

US 2008/0316622 A1 Dec. 25, 2008

(51) Int. Cl.
G02B 7/02 (2006.01)
(52) U.S. Cl. ...................................... 359/820
(58) Field of Classification Search ................. 359/820; 720/600–746
See application file for complete search history.

(56) References Cited

U.S. PATENT DOCUMENTS

| | | | |
|---|---|---|---|
| 2004/0227838 A1* | 11/2004 | Atarashi et al. | 348/340 |
| 2006/0013109 A1* | 1/2006 | Fujiwara et al. | 369/112.01 |
| 2007/0008286 A1* | 1/2007 | Theytaz et al. | 345/166 |
| 2007/0008836 A1* | 1/2007 | Imagawa et al. | 369/44.23 |
| 2007/0274366 A1* | 11/2007 | Oka | 372/101 |

* cited by examiner

Primary Examiner—Jessica T Stultz
Assistant Examiner—Mahidere S Sahle
(74) Attorney, Agent, or Firm—Winston Hsu

(57) ABSTRACT

The invention discloses a spherical aberration control method for controlling spherical aberration of an optical device. The method includes: detecting a current ambient temperature of the optical device; and controlling the spherical aberration of the optical device according to the current ambient temperature.

14 Claims, 6 Drawing Sheets

SPHERICAL ABERRATION CONTROL METHOD AND RELATED APPARATUS

BACKGROUND

The invention relates to a spherical aberration control method and related apparatus, and more particularly to a spherical aberration control method that adjusts the spherical aberration of an optical device according to temperature variation, and a related apparatus.

With increasing demands for larger storage capacity, traditional CDs and DVDs can no longer satisfy user requirements. Blu-ray discs (BD) and High Density Digital Versatile Discs (HD-DVD) providing large data storage size are becoming the future of optical storage. The numerical aperture (NA) of an object lens used in a BD optical disc driver and an HD-DVD optical disc driver is 0.85 and 0.65 respectively, both apertures being significantly larger than the 0.45 NA object lens of a traditional CD optical disc driver. Also, BDs and the HD-DVDs have multi-layer structures and can thus provide larger storage capacity than conventional optical storage.

Certain major aberrations in an optical system are spherical aberration, coma aberration, astigmatism, and curvature of field. A lens is theoretically capable of focusing light onto a single point. The light spot is required to focus on a specific surface on an optical storage medium. However, spherical aberration causes that the lens fails to focus incident light onto a single point. The erroneous focusing of the lens can be caused by the thickness variation of an optical storage medium, in which the laser light could not focus onto the required surface of the storage medium for data access. The erroneous focusing may also result from a zonal distribution of the focusing position (more particularly in the direction of light). Another reason is that the thickness or surface curvature of the lens varies with temperature, expanding when hot and shrinking when cold, which will also cause the failure of the laser light to focus onto the required surface of the storage medium for data access.

SUMMARY

Therefore, one of the objectives of the invention is to provide a spherical aberration control method and related apparatus to adjust the lens position of the optical pick-up unit according to temperature variation.

According to an embodiment of the invention, a spherical aberration control method is disclosed. The spherical aberration control method controls spherical aberration of an optical device, and the method has the following steps: detecting a current ambient temperature of the optical device; and controlling the spherical aberration of the optical device according to the current ambient temperature.

According to an embodiment of the invention, a spherical aberration control apparatus is disclosed. The spherical aberration control apparatus is utilized for controlling spherical aberration of an optical device, and the apparatus has a temperature detection unit and a compensating unit. The temperature detection unit is coupled to the optical device and utilized for detecting a current ambient temperature of the optical device. The compensating unit is coupled to the temperature detection unit and the optical device, and utilized for setting the spherical aberration of the optical device according to the current ambient temperature.

These and other objectives of the invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
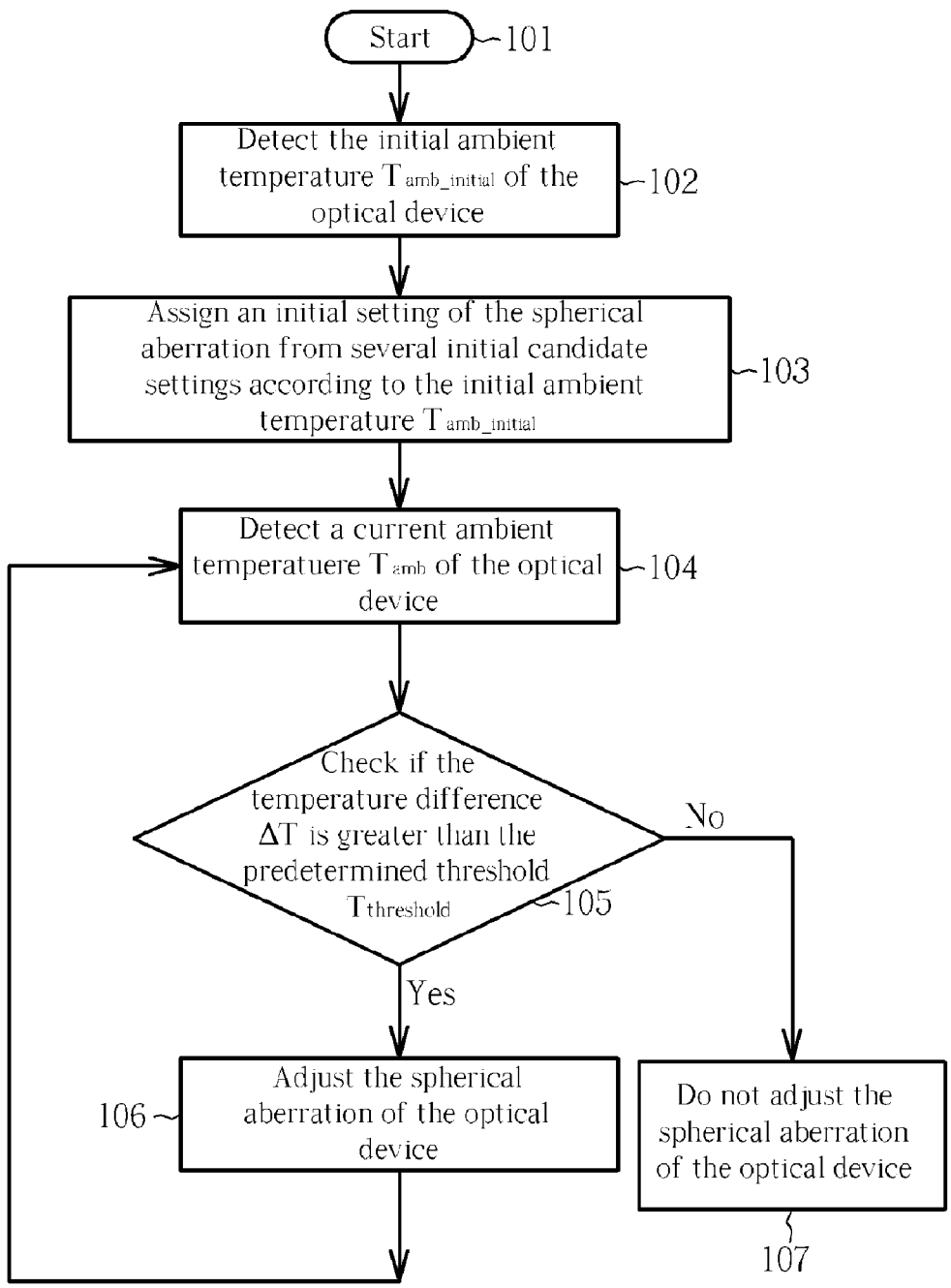
FIG. 1 is a flowchart illustrating a spherical aberration control method according to a first embodiment of the invention.

FIG. 1 is a flowchart illustrating a spherical aberration control method according to a first embodiment of the invention. The spherical aberration control method has the following steps:

Step 101: Start;

Step 102: Detect an initial ambient temperature $T_{amb\_initial}$ of the optical device;

Step 103: Assign an initial setting of the spherical aberration from several initial candidate settings according to the initial ambient temperature $T_{amb\_initial}$;

Step 104: Detect a current ambient temperature $T_{amb}$ of the optical device;

Step 105: Check if a temperature difference $\Delta T$ between the current ambient temperature $T_{amb}$ and a previous ambient temperature $T_{pre}$ is greater than a predetermined threshold $T_{threshold}$. When the temperature difference $\Delta T$ is greater than the predetermined threshold $T_{pre}$, go to step 106; otherwise, go to step 107.

Step 106: Adjust the spherical aberration of the optical device, go to step 104;

Step 107: Do not adjust the spherical aberration of the optical device.

The initial setting of the above-mentioned spherical aberration can be determined by adjusting the position of the optical device to change the focusing position, a size of the focusing light spot, . . . , or other factors (but not limited), for deriving a better quality signal.

In general, the spherical aberration of the optical device can be adjusted by using a skew stepping motor (or a skew feeder), a voice coil, a piezoelectric actuator, or a Liquid Crystal (LC) focusing device. Specifically, the skew stepping motor, voice coil, or the piezoelectric actuator is utilized for driving a positive aberration lens and a negative aberration lens to adjust the difference between the positive aberration lens and the negative aberration lens. An advantage of the skew stepping motor is that the motor moves precisely and therefore it is not required to use an additional sensor for helping the motor. The voice coil and the piezoelectric actuator are suitable to be applied in a device having spherical aberration feedback control. Particularly, the voice coil and piezoelectric actuator can rapidly adjust the spherical aberration during a shorter response time, such as several mini seconds. Using the LC focusing device to adjust the spherical aberration is achieved by controlling the applying voltage of a LC focusing device to change the refraction path which the light passes through. Usually, a response time of the LC focusing device is approximately equal to 5-10 mini seconds.

Figure 2:
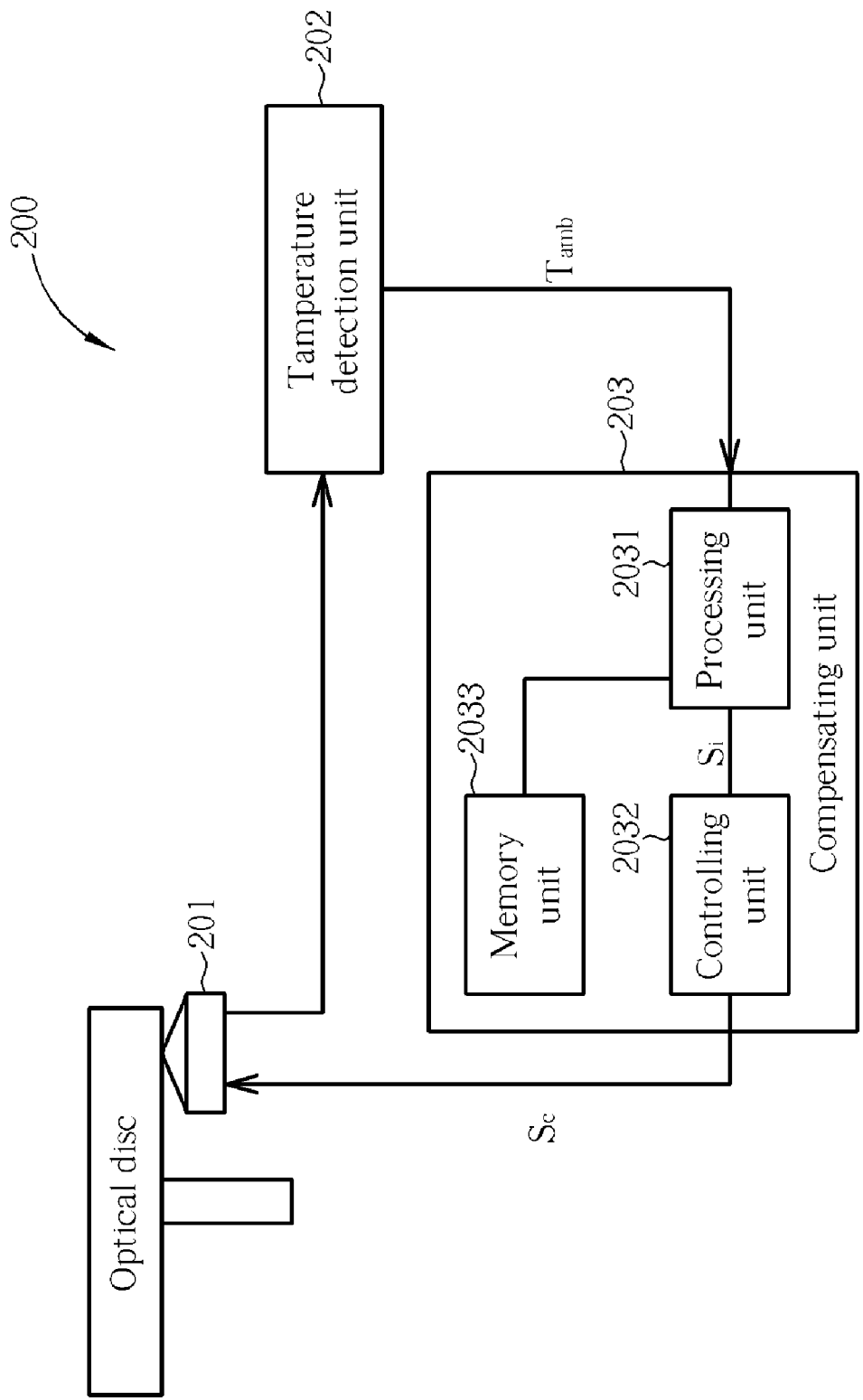
FIG. 2 is a diagram illustrating a spherical aberration control apparatus according to FIG. 1.

FIG. 2 is a diagram illustrating a spherical aberration control apparatus 200 according to FIG. 1. The spherical aberration control apparatus 200 is utilized for controlling spherical aberration of an optical device 201. For example, the spherical aberration control apparatus 200 is used for controlling spherical aberration of an optical pick up unit. The spherical aberration control apparatus 200 has a temperature detection unit 202 and a compensating unit 203.

The temperature detection unit 202 is coupled to the optical device 201 for detecting a current ambient temperature $T_{amb}$ of the optical device 201. The temperature detection unit 202 also detects the initial ambient temperature $T_{amb\_initial}$ of the optical device 201. The compensating unit 203 is coupled to the temperature detection unit 202 and the optical device 201 for controlling the spherical aberration of the optical device 201 according to the current ambient temperature $T_{amb}$.

The compensating unit 203 has a processing unit 2031, a controlling unit 2032, and a memory unit 2033. The processing unit 2031 is coupled to the temperature detection unit 202 for generating the indication signal $S_i$ when the temperature difference $\Delta T$ between the current ambient temperature $T_{amb}$ and the previous ambient temperature $T_{pre}$ is greater than the predetermined threshold $T_{threshold}$. The processing unit 2031 is also utilized for calculating whether the temperature difference $\Delta T$ between the current ambient temperature $T_{amb}$ and a previous ambient temperature $T_{pre}$ is greater than the predetermined threshold $T_{threshold}$. Moreover, the processing unit 2031 is also used for selecting an initial setting of the spherical aberration from the initial candidate settings.

Furthermore, the controlling unit 2032 is coupled to the processing unit 2031 and the optical device 201 for generating a control signal $S_c$ to adjust the spherical aberration of the optical device 201 according to the indication signal $S_i$. More specifically, the controlling unit 2032 controls the optical device 201 by converting or amplifying the indicating signal $S_i$. Usually, the controlling unit 2032 generates the control signal $S_c$ to control the optical device 201 through an actuator (not shown in FIG. 2).

The memory unit 2033 is utilized for storing the initial candidate settings of the spherical aberration corresponding to several ambient temperature ranges respectively (e.g. low temperature, typical temperature, or high temperature). Initially, the processing unit 2031 selects the initial setting of the spherical aberration from the initial candidate settings when the temperature detection unit 202 detects that the initial ambient temperature $T_{amb\_initial}$ falls in a specific ambient temperature range (e.g. low temperature, typical temperature, or high temperature) of the ambient temperature ranges. For example, when the initial ambient temperature $T_{amb\_initial}$ is a low temperature (e.g. 5° C.), the processing unit 2031 selects the initial setting of the spherical aberration that approximates to the low temperature.

When the ambient temperature of the lens (not shown) of the optical device 201 is changed with the environment, the focused spot on the optical disc which is accessed by the optical device 201 is also changed. In other words, the spherical aberration of the lens is changed, and this will result in erroneous data accessing of the optical device 201. Therefore, according to the first embodiment of the invention, the temperature detection unit 202 detects the current ambient temperature $T_{amb}$ of the optical device 201 (step 104) and outputs the current ambient temperature $T_{amb}$ to the processing unit 2031. The processing unit 2031 receives the current ambient temperature $T_{amb}$ and registers the current ambient temperature $T_{amb}$. Therefore, when a next ambient temperature is received by the processing unit 2031, the current ambient temperature $T_{amb}$ is registered to be the previous ambient temperature $T_{pre}$ and the next ambient temperature is registered to be the current ambient temperature $T_{amb}$. Accordingly, the processing unit 2031 checks if the temperature difference $\Delta T$ between the current ambient temperature $T_{amb}$ and the previous ambient temperature $T_{pre}$ is greater than the predetermined threshold $T_{threshold}$ (step 105).

When the temperature difference $\Delta T$ is greater than the predetermined threshold $T_{threshold}$, the processing unit 2031 outputs the indication signal $S_i$. Please note that the indication signal $S_i$ depends on the temperature difference $\Delta T$. For example, in one of the embodiments of the invention, the indication signal $S_i$ is proportional to the magnitude of the temperature difference $\Delta T$. The setting between the indication signal $S_i$ and the magnitude of the temperature difference $\Delta T$ can be easily understood by those skilled in this art, therefore a detailed description is omitted here for brevity.

Then, the controlling unit 2032 receives the indication signal $S_i$ and generates the control signal $S_c$ according to the value of the indication signal $S_i$ for adjusting the spherical aberration of the optical pick-up unit 201 (step 106). The control signal $S_c$ can be generated by the indication signal $S_i$ from the initial candidate settings of the spherical aberration corresponding to the ambient temperature ranges stored in the memory unit 2033, or by the indication signal $S_i$ corresponding to the magnitude of the temperature difference $\Delta T$. For example, in step 106, the controlling unit 2032 adjusts spherical aberration by moving the lens position of the optical device 201 to the optimum position, which has the optimum spherical aberration of the optical device 201. Similarly, the adjustment of the lens position of the optical device 201 is well known by those skilled in this art, therefore the detailed description is omitted here for brevity. When the processing unit 2031 detects that the temperature difference $\Delta T$ between the current ambient temperature $T_{amb}$ and the previous ambient temperature $T_{pre}$ is not greater than the predetermined threshold $T_{threshold}$, the processing unit 2031 will not output the indication signal $S_i$ and the spherical aberration control apparatus 200 will not adjust the spherical aberration of the optical device 201 (step 107). In other words, the lens position of the optical device 201 is kept at the current position.

Figure 3:
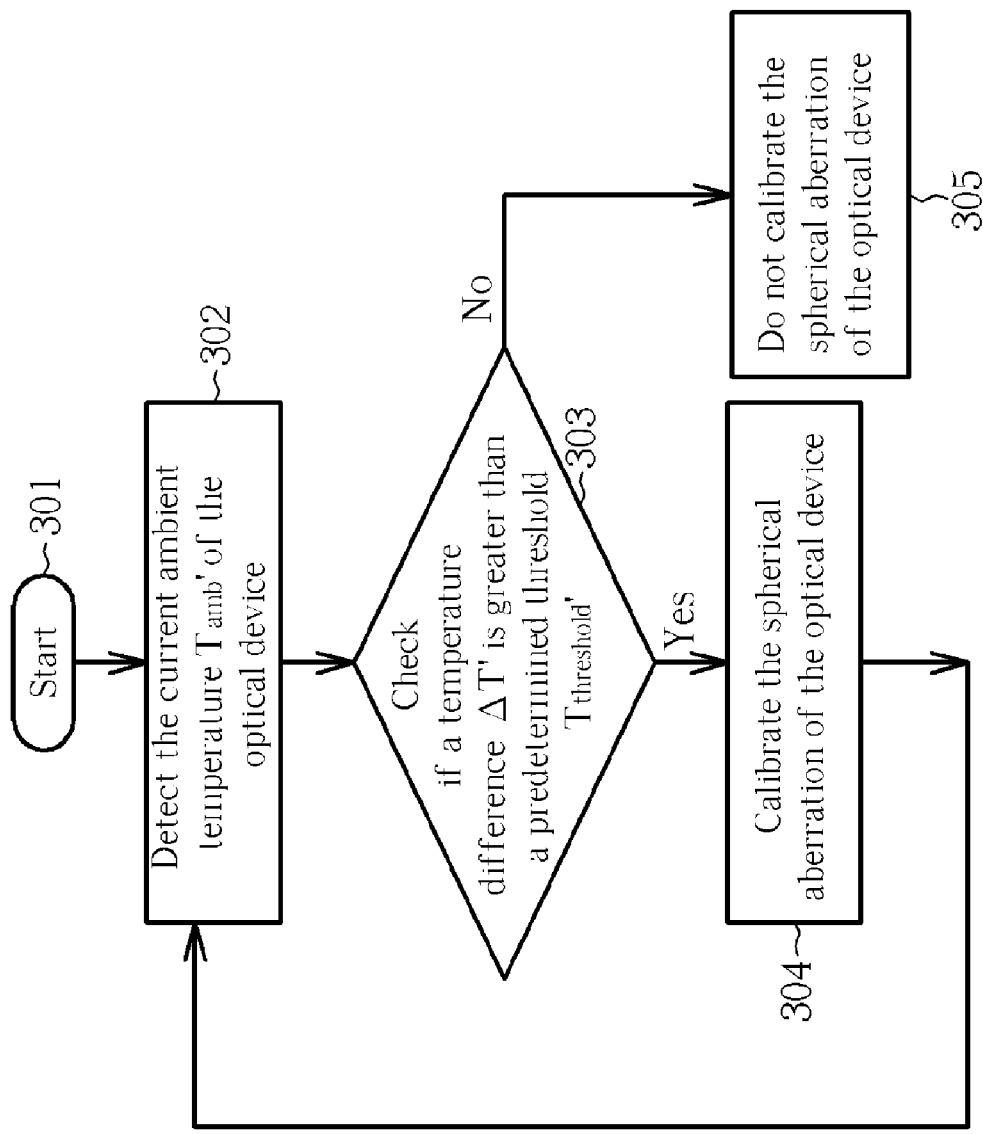
FIG. 3 is a flowchart illustrating the spherical aberration control method according to a second embodiment of the invention.

FIG. 3 is a flowchart illustrating a spherical aberration control method according to a second embodiment of the invention. The spherical aberration control method has the following steps:

Step 301: Start;
Step 302: Detect the current ambient temperature $T_{amb}'$ of the optical device;
Step 303: Check if a temperature difference $\Delta T'$ between a current ambient temperature $T_{amb}'$ and a previous ambient temperature $T_{pre}'$ is greater than a predetermined threshold $T_{threshold}'$. When the temperature difference $\Delta T'$ is greater than the predetermined threshold $T_{pre}'$, go to step 304; otherwise, go to step 305.

Step 304: Calibrate the spherical aberration of the optical device. Go to step 302.

Step 305: Do not calibrate the spherical aberration of the optical device.

Figure 4:
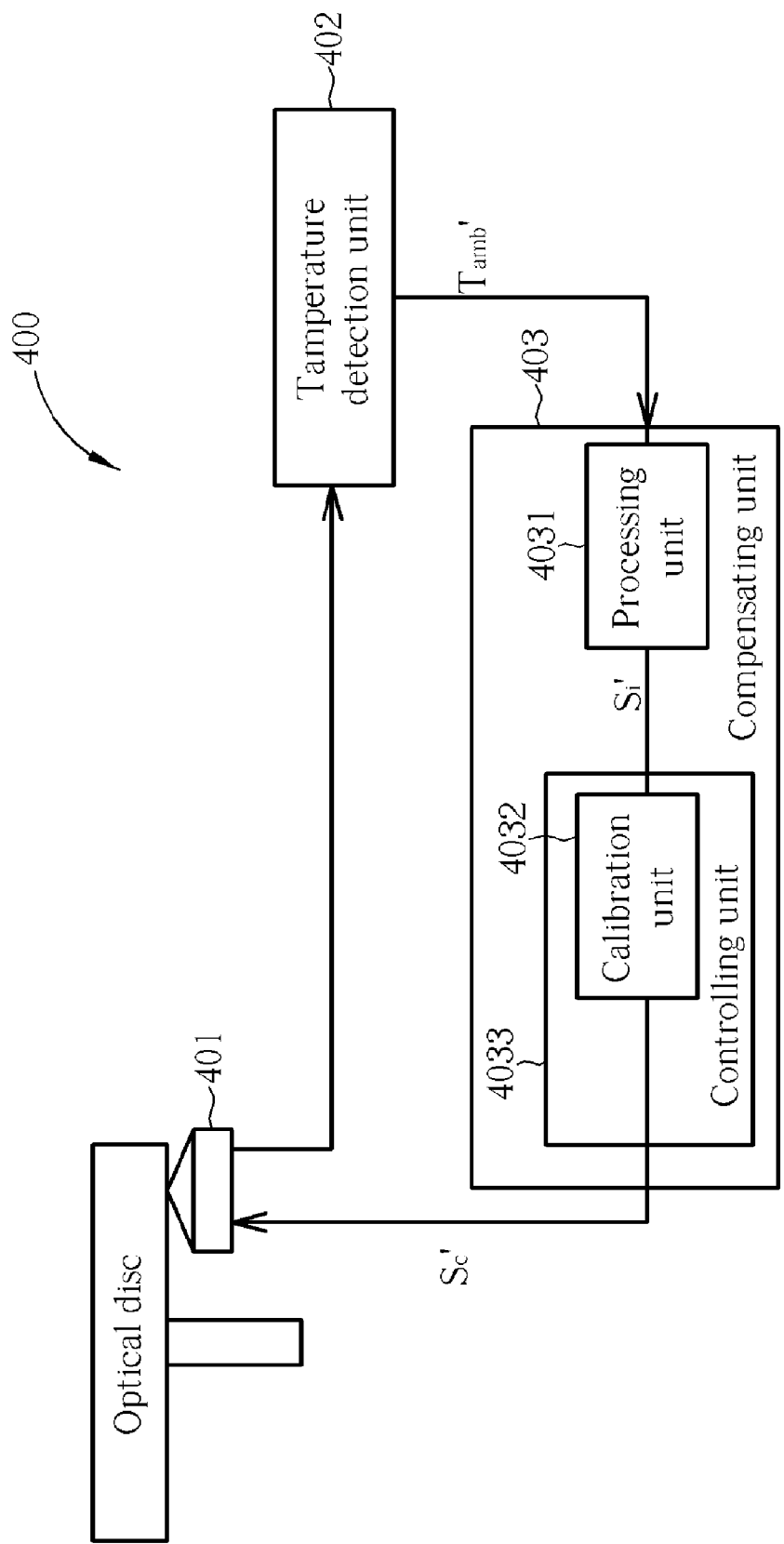
FIG. 4 is a diagram illustrating a spherical aberration control apparatus according to FIG. 3.

FIG. 4 is a diagram illustrating a spherical aberration control apparatus 400 according to FIG. 3. The spherical aberration control apparatus 400 is utilized for controlling a spherical aberration of an optical device 401, and the spherical aberration control apparatus 400 has a temperature detection unit 402 and a compensating unit 403. The compensating unit 403 has a processing unit 4031 and a controlling unit 4033. The controlling unit 4033 has a calibration unit 4032 inside. Please note that, the spherical aberration control apparatus 400 is similar to the spherical aberration control apparatus 200.

According to the embodiment of the invention, the calibration unit 4032 is implemented in the controlling unit 4033 for performing spherical aberration calibration to adjust the spherical aberration of the optical device 401 according to the indication signal $S_i'$, however this is not be the limitation of the invention. In other words, in another embodiment, the calibration unit 4032 may be installed in other locations within the compensating unit 403, for example, the calibration unit 4032 can be installed within the processing unit 4031.

When the processing unit 4031 determines that the temperature difference $\Delta T'$ between the current ambient temperature $T_{amb}'$ and the previous ambient temperature $T_{pre}'$ is greater than the predetermined threshold $T_{threshold}'$ (step 303), the processing unit 4031 outputs the indication signal $S_i'$ to the calibration unit 4032.

Then in the step 304, the calibration unit 4032 utilizes the control signals $S_c'$ from the controlling unit 4033 to perform the spherical aberration calibration for calibrating the lens position of the optical device 401. Thus, the optical device 401 is moved to the optimum position with the optimum spherical aberration. Please note that, as the calibration unit 4032 re-performs the spherical aberration calibration for the lens position of the optical device 401, the indication signal $S_i'$ may not depend on the magnitude of the temperature difference $\Delta T'$. Furthermore, the spherical aberration calibration for calibrating the lens position of the optical device 401 is well known by those skilled in this art, thus a detailed description is omitted here for brevity.

In another embodiment of the invention, the spherical aberration control apparatus calibrates the lens position of the optical pick-up unit 401, i.e. performs the spherical aberration calibration, whenever the current ambient temperature $T_{amb}'$ is different from the previous ambient temperature $T_{pre}'$. As the operation of this embodiment is mostly similar to the second embodiment, the detailed description is omitted here for brevity.

Please note that, in the second embodiment, the spherical aberration control apparatus 400 adjusts the spherical aberration of the optical device 401 whenever the temperature difference $\Delta T$ between the current ambient temperature $T_{amb}$ and the previous ambient temperature $T_{pre}$ is greater than the predetermined threshold $T_{threshold}$. However, in another embodiment of the invention, a spherical aberration control apparatus adjusts the spherical aberration of the optical device 401, i.e. performs a spherical aberration calibration, whenever the current ambient temperature $T_{amb}$ is different from the previous ambient temperature $T_{pre}$. As the operation of this embodiment is mostly similar to the description above, the detailed description is omitted here for brevity.

Figure 5:
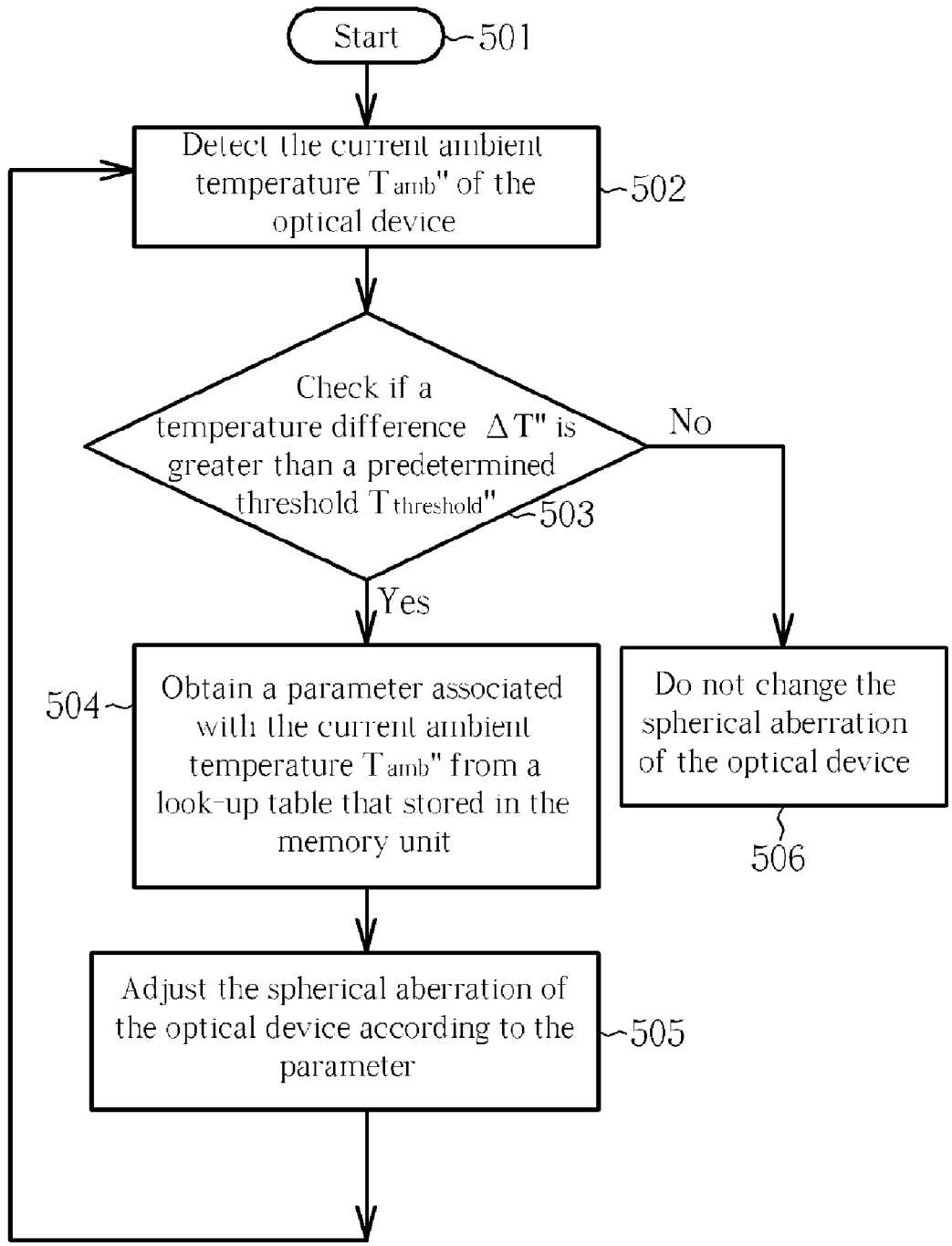
FIG. 5 is a flowchart illustrating the spherical aberration control method according to a third embodiment of the invention.

FIG. 5 is a flowchart illustrating a spherical aberration control method according to a third embodiment of the invention. The spherical aberration control method has the following steps:

Step 501: Start;

Step 502: Detect the current ambient temperature $T_{amb}''$ of an optical device;

Step 503: Check if a temperature difference $\Delta T''$ between a current ambient temperature $T_{amb}''$ and a previous ambient temperature $T_{pre}''$ is greater than a predetermined threshold $T_{threshold}''$. When the temperature difference $\Delta T''$ is greater than the predetermined threshold Tpre", go to step 504; otherwise, go to step 506.

Step 504: Obtain a parameter associated with the current ambient temperature $T_{amb}''$ from a look-up table stored in a memory unit;

Step 505: Generating a control signal to adjust the spherical aberration of the optical device according to the parameter. Go to step 502;

Step 506: Do not change the spherical aberration of the optical device.

Figure 6:
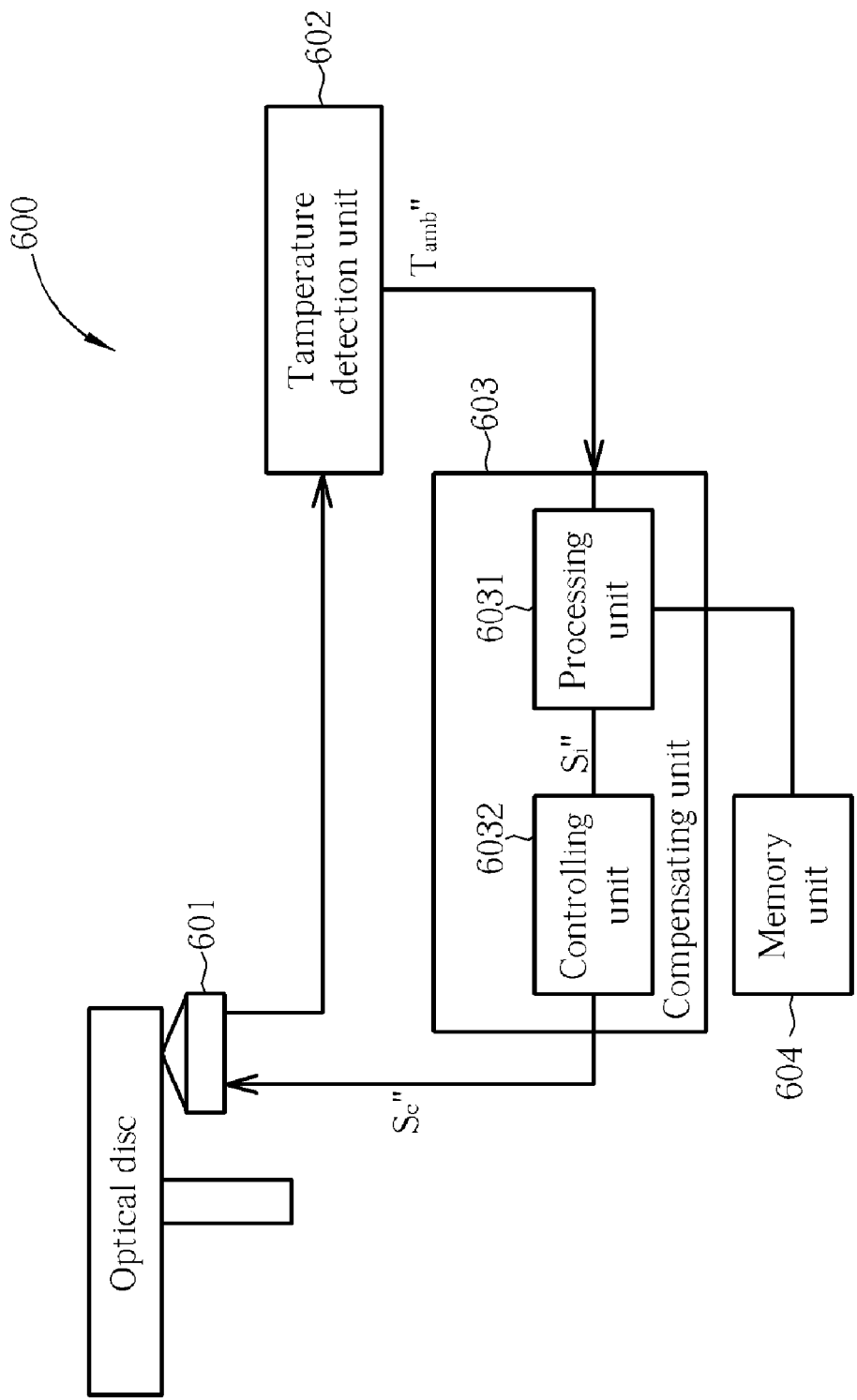
FIG. 6 is a diagram illustrating a spherical aberration control apparatus according to FIG. 5.

FIG. 6 is a diagram illustrating a spherical aberration control apparatus 600 according to FIG. 5. The spherical aberration control apparatus 600 is utilized for controlling a spherical aberration of an optical device 601, and the spherical aberration control apparatus 600 has a temperature detection unit 602, a compensating unit 603, and a memory unit 604. The compensating unit 603 has a processing unit 6031, and a controlling unit 6032.

Please note that, the spherical aberration control apparatus 600 is similar to the spherical aberration control apparatuses 200 and 400. According to the embodiment of the invention, the memory unit 604 is coupled to the controlling unit 6032 for storing a look-up table, wherein the look-up table has several parameters associated with the several ambient temperatures $T_{amb}''$; and the controlling unit 6032 generates the control signal $S_c''$ to adjusts the spherical aberration of the optical device 601 according to the parameter. For example, these control signals $S_c''$ according to the parameters can be utilized for adjusting the lens position of the optical device 601 to obtain an optimal spherical aberration. Please note that, in another embodiment, the memory unit 604 may be installed in other locations of the spherical aberration control apparatus 600, for example, the memory unit 604 can be installed within the compensating unit 603.

When the processing unit 6031 determines that the temperature difference $\Delta T''$ between the current ambient temperature $T_{amb}''$ and the previous ambient temperature $T_{pre}''$ is greater than the predetermined threshold $T_{threshold}''$ (step 503), the processing unit 6031 outputs the indication signal $S_i''$ to the controlling unit 6032. According to the third embodiment of the invention, the indication signal $S_i''$ depends on the magnitude of the temperature difference $\Delta T''$. In other words, specific magnitude of the temperature difference $\Delta T''$ can be matched to a corresponding parameter in the look up table to get the optimal spherical aberration.

Therefore, when the controlling unit 6032 receives the indication signal $S_i''$, the controlling unit 6032 obtains the parameter associated with the current ambient temperature $T_{amb}''$ from the look-up table stored in the memory unit 604 (step 504). Then, the controlling unit 6032 adjusts the spherical aberration of the optical device 601 according to the parameter from the look up table (step 505) to get the optimal spherical aberration. Accordingly, the lens position of the optical device 601 can be adjusted to the appropriated position. Thus, the optical device 601 is moved to the optimum position with optimum spherical aberration.

In another embodiment of the invention, the spherical aberration control apparatus calibrates the lens position of the optical device 601, i.e. obtain the target spherical aberration associated with the current ambient temperature $T_{amb}"$ from the look up table that stored in the memory unit 604, whenever the current ambient temperature $T_{amb}"$ is different from the previous ambient temperature $T_{pre}"$. As the operation of this embodiment is mostly similar to the second embodiment, the detailed description is omitted here for brevity.

From the description above, the embodiments adjust the lens position of the optical devices when the temperature difference between the current ambient temperature and the previous ambient temperature is greater than the predetermined threshold, or when the current ambient temperature is different from the previous ambient temperature. As the operations of those embodiments are mostly similar to the above-mentioned embodiment, the detailed description is omitted here for brevity. Furthermore, the steps of the flowchart shown in FIG. 1, FIG. 3 and FIG. 5 need not be in the exact order shown and need not be contiguous, that is, other steps can be intermediated. Those skilled in the art will readily observe that numerous modifications and alterations of the device and method may be made while retaining the teachings of the invention.

What is claimed is:

1. A spherical aberration control method for controlling spherical aberration of an optical device utilized for accessing an optical disc, the method comprising:
   detecting a current ambient temperature of the optical device;
   checking if a temperature difference between a current ambient temperature and a previous ambient temperature is greater than a predetermined threshold, wherein the previous ambient temperature is detected prior to detecting the current ambient temperature; and
   when the temperature difference is greater than the predetermined threshold, generating a control signal to adjust the spherical aberration of the optical device.

2. The spherical aberration control method of claim 1, wherein the step of generating the control signal to adjust the spherical aberration comprises:
   performing a spherical aberration calibration to adjust the spherical aberration of the optical device.

3. The spherical aberration control method of claim 1, wherein the step of generating the control signal to adjust the spherical aberration comprises:
   obtaining a parameter associated with the current ambient temperature from a look-up table; and
   generating a control signal to adjust the spherical aberration of the optical device according to the parameter.

4. The spherical aberration control method of claim 1, further comprising:
   generating the control signal to perform a spherical aberration calibration to adjust the spherical aberration of the optical device when the current ambient temperature is different from the previous ambient temperature.

5. The spherical aberration control method of claim 1, further comprising:
   obtaining a parameter associated with the current ambient temperature from a look-up table; and
   generating the control signal to adjust the spherical aberration of the optical device according to the parameter.

6. The spherical aberration control method of claim 1, further comprising:
   generating an indication signal to assign an initial setting of the spherical aberration to the optical device according to the current ambient temperature.

7. The spherical aberration control method of claim 6, wherein the step of generating the indication signal to assign the initial setting comprises:
   providing a plurality of initial candidate settings of the spherical aberration corresponding to a plurality of ambient temperature ranges respectively; and
   when the current ambient temperature falls in a specific ambient temperature range of the ambient temperature ranges, selecting the initial setting of the spherical aberration from the initial candidate settings.

8. A spherical aberration control apparatus, for controlling a spherical aberration of an optical device utilized for accessing an optical disc, the apparatus comprising:
   a temperature detection unit, coupled to the optical device, for detecting a current ambient temperature of the optical device; and
   a compensating unit, coupled to the temperature detection unit and the optical device, for controlling the spherical aberration of the optical device according to a relationship between the current ambient temperature and a previous ambient temperature detected prior to detecting the current ambient temperature, wherein the compensating unit comprises:
      a processing unit, coupled to the temperature detection unit, for generating an indication signal when a temperature difference between the current ambient temperature and the previous ambient temperature is greater than a predetermined threshold; and
      a controlling unit, coupled to the processing unit and the optical device, for generating a control signal to adjust the spherical aberration of the optical device according to the indication signal.

9. The spherical aberration control apparatus of claim 8, wherein the controlling unit comprises:
   a calibration unit for performing a spherical aberration calibration to adjust the spherical aberration of the optical device according to the indication signal.

10. The spherical aberration control apparatus of claim 8, further comprising:
    a memory unit for storing a look-up table, wherein the look-up table has a parameter associated with the current ambient temperature; wherein the controlling unit adjusts the spherical aberration of the optical device according to the parameter.

11. The spherical aberration control apparatus of claim 8, wherein the compensating unit comprises:
    a calibration unit for performing a spherical aberration calibration to adjust the spherical aberration of the optical device when the current ambient temperature is different from the previous ambient temperature.

12. The spherical aberration control apparatus of claim 8, further comprising:
    a memory unit for storing a look-up table, wherein the look-up table has a parameter associated with the current ambient temperature, and the compensating unit adjusts the spherical aberration of the optical device according to the parameter when the current ambient temperature is different from the previous ambient temperature.

13. The spherical aberration control apparatus of claim 8, wherein the processing unit is further utilized for assigning an initial setting of the spherical aberration to the optical device according to the current ambient temperature.

14. The spherical aberration control apparatus of claim 13, further comprising:
a memory unit for storing a plurality of initial candidate settings of the spherical aberration corresponding to a plurality of ambient temperature ranges respectively, and the controlling unit selects the initial setting of the spherical aberration from the initial candidate settings when the current ambient temperature falls in a specific ambient temperature range of the ambient temperature ranges.

* * * * *